Dec. 31, 1929. E. SLADE 1,741,796
BRAKE SYSTEM AND MECHANISM
Filed May 21, 1927   2 Sheets-Sheet 1
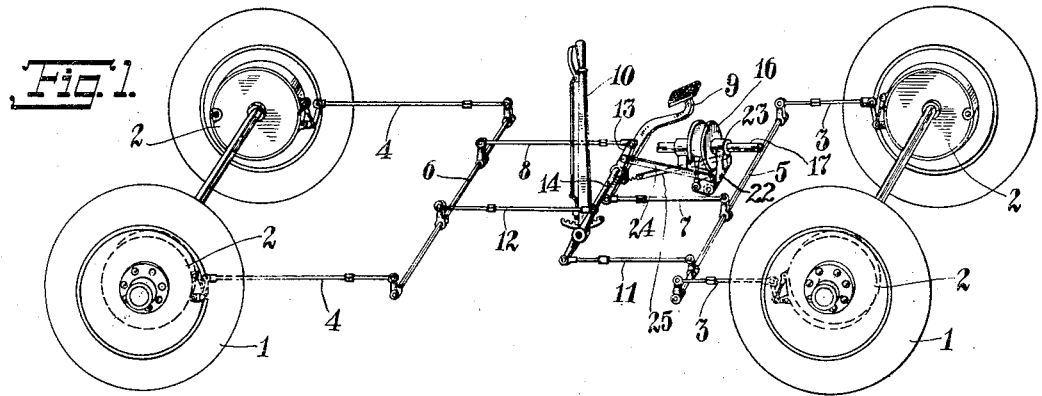
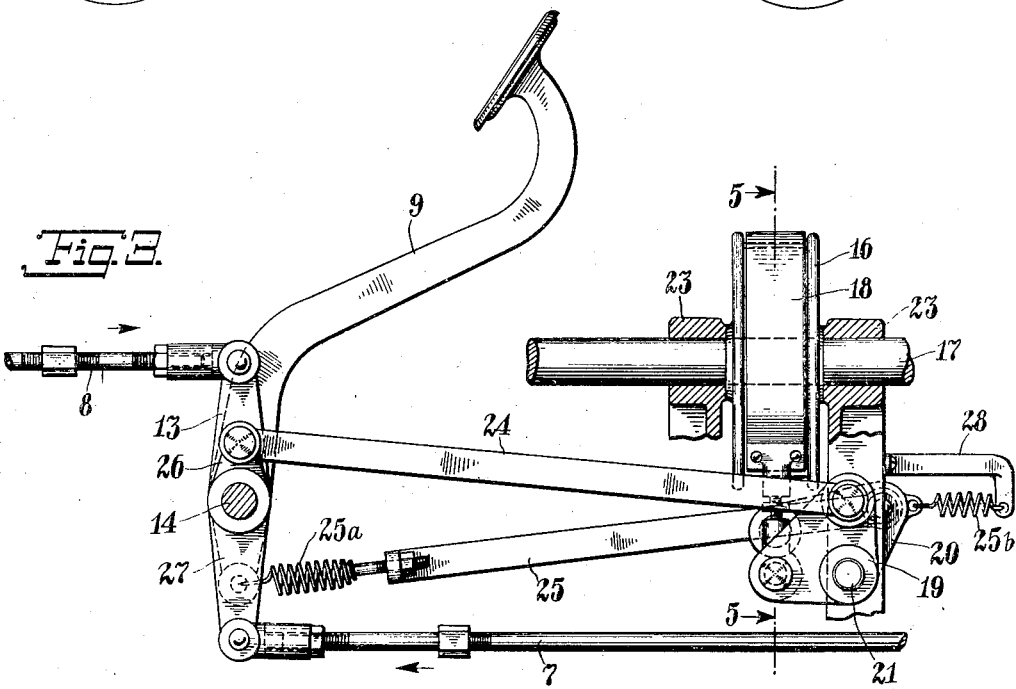
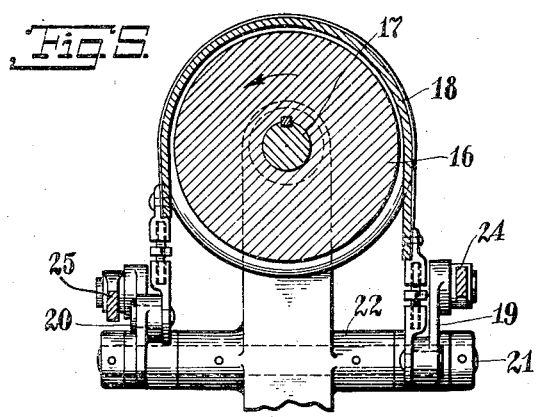
INVENTOR.
Edward Slade
BY
ATTORNEY Dec. 31, 1929.  E. SLADE  1,741,796
BRAKE SYSTEM AND MECHANISM
Filed May 21, 1927  2 Sheets-Sheet 2
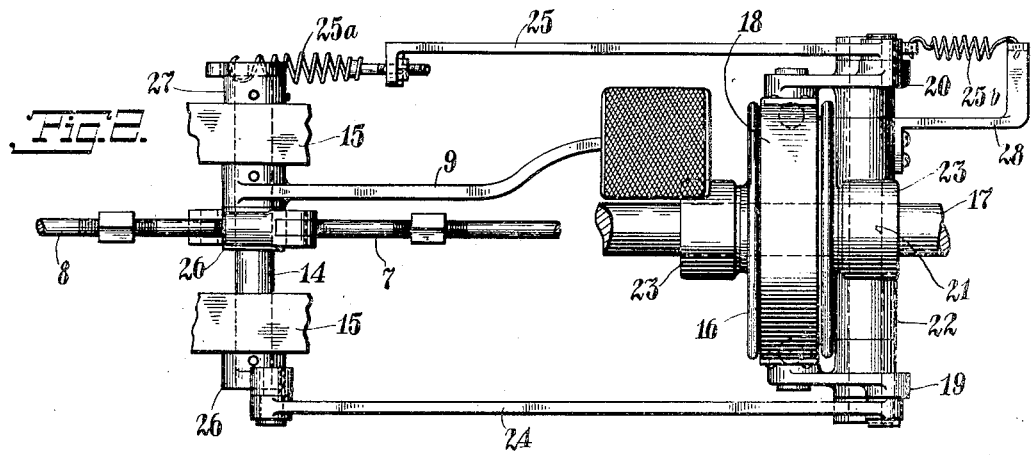
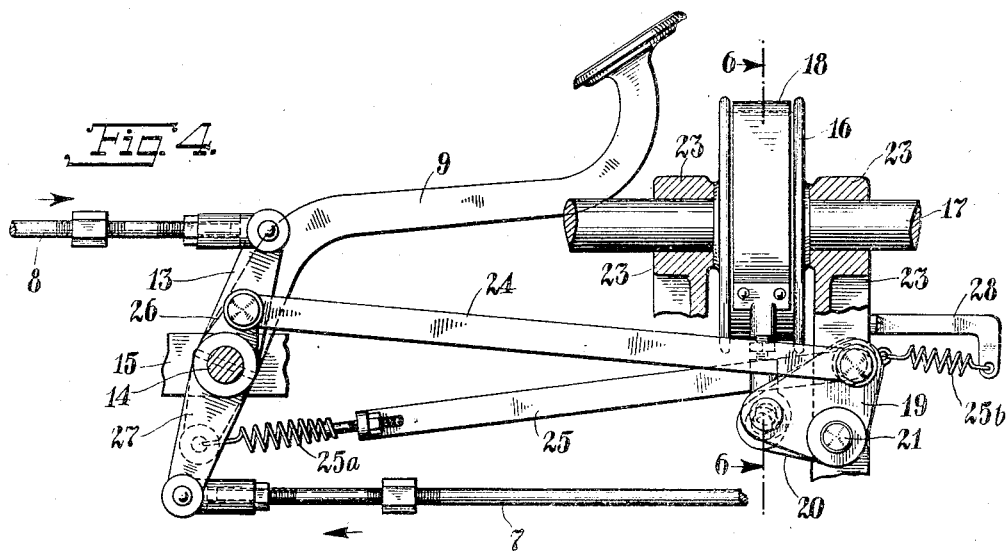
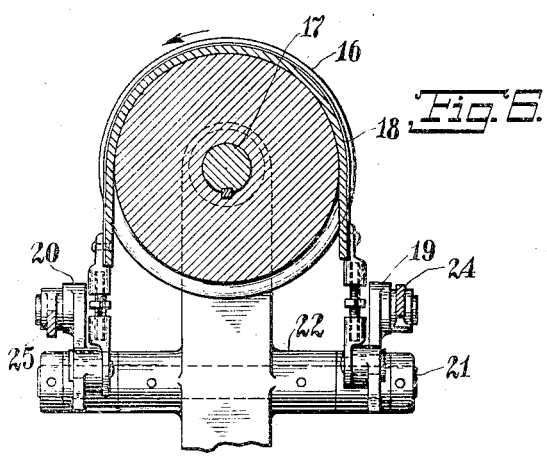

Patented Dec. 31, 1929

1,741,796

UNITED STATES PATENT OFFICE

EDWARD SLADE, OF NEW YORK, N. Y.

BRAKE SYSTEM AND MECHANISM

Application filed May 21, 1927. Serial No. 193,269.

My invention relates to a system and mechanism for applying brakes to moving bodies or apparatus of any character to retard or arrest the movement, and relates more particularly to a system and mechanism for retarding or arresting the rotary movement of the wheels of moving vehicles, and especially motor driven vehicles.

The main object of my invention is to provide a system and mechanism whereby the braking action or pressure required to apply the brakes for retarding or arresting the movement of a moving body or vehicle is derived from the driving power or momentum of the moving body or vehicle, and to control the application thereof manually, either by means of a foot pedal or hand lever; and secondly the object is to provide a system and mechanism whereby the brakes may be applied manually and increased pressure obtained through the driving power or momentum of the moving body or vehicle.

In carrying my invention into effect I employ a brake or brakes, operating levers and connecting links, of any approved type, in conjunction with a friction device operatively connected between the brake lever system and the brake controlling or setting means. This friction device is moved into functioning position by the brake controlling or setting means and when so moved is actuated by the moving body or vehicle and transmits power to the brake levers.

The friction device is preferably in the form of a brake consisting of a wheel and shoes or a drum and band. The wheel or drum is carried by a shaft, which may be the driving shaft for imparting motion to a moving body or vehicle or a shaft driven thereby. The friction band or shoes, which are normally out of contact with the drum or wheel, are mounted upon suitably pivoted levers or cranks and connected with the brake lever system and controlling means in such manner that when the brake controlling means is operated, manually or otherwsie, to apply the brake which retards or arrests the movement of the body or vehicle, the friction band or shoes will be brought into contact with the rotating drum or wheel, and the energy absorbed by such frictional engagement will create a pull on the brake lever system and apply power to the brake. The connection between the brake controlling or setting means and the friction device will be so arranged that the degree of contact at the friction device will gradually increase with the continued movement of such means. The amount of power or pressure thus applied to the brake will depend upon the degree of frictional engagement at the friction device, and the degree of friction will depend upon the degree of movement of the brake controlling or setting means; and since the pressure exerted upon the brake is dependent upon the degree of friction at the friction device, or in other words, upon the extent of movement of the brake controlling or setting means, it is obvious that the power applied to the brake will be independent of the amount of pressure applied to the brake controlling means by the operator, and that the degree of movement thereof, is the controlling factor, and hence in manually operated brakes no fatigue will result to the operator as is the case in direct manually operated brake systems. It will also be obvious that in a brake system embodying my invention the connections between the brake lever system and the friction device may be so adjusted that movement of the manually operated controlling or setting means will first effect a light application of the brake and then by continued movement of the controlling means bring the friction band into engagement with its drum and apply power to the brake lever system, thus supplementing the manual power.

In illustrating my invention I have shown its application to a motor driven vehicle, and in the drawings forming part of this specification, Figure 1 is a schematic view illustrating a four-wheel brake system for a motor driven vehicle; Figure 2 a plan view illustrating one form of friction device that may be employed in carrying my invention into effect; Figure 3 an elevation of the same with the parts in the normal or non-functioning position; Figure 4 a similar view illustrating the mechanism in the position assumed after the brake controlling device or foot pedal has been operated to apply the brakes; Figure 5 a sectional view on line 5—5 through Figure 3 looking in the direction of the arrow, and Figure 6 a sectional view on line 6—6 through Figure 4 looking in the direction of the arrow.

In Figure 1 of the drawings, the four wheels of a motor driven vehicle are represented at 1, and the brakes at 2, one for each wheel. 3—3 indicate the connecting links for the forward brakes, 4—4 the connecting links for the rear brakes, 5 and 6 the rock-shaft for same, 7 and 8 the operating links which actuate the rock-shaft, 9 the pedal for actuating or controlling the brake lever system, and 10 the emergency brake lever which is operatively connected with the links 11 and 12 connected respectively to the rock-shaft 5 and 6.

Referring now more particularly to Figures 2, 3, and 4, it will be observed that the links 7 and 8 are adjustably connected to a lever 13 which is centrally mounted and fixed on a bar 14, supported by and free to rock in bearings 15, which in practice will be fixed in any suitable manner upon the chassis of the motor vehicle. The emergency brake lever may also be mounted on this bar if desired, or it may be separately mounted depending upon the character and general construction of the motor vehicle.

From the foregoing it will be observed that when the pedal 9 is moved forward to apply the brakes, bar 14 and lever 13 will be rocked from the position shown in Figure 3 to the position shown in Figure 4, which movement pulls the connecting links 7 and 8 in a direction indicated by the arrows, and this movement will cause a corresponding rocking motion to be imparted to the rock-shaft 5 and 6 (Figure 1) and a pull imparted to connecting links 3 and 4, and thus applying the brakes according to common practice in operating motor vehicles; and by the operation of the parts thus described, it will be noticed that the pull or power applied to the brakes will depend entirely upon the pressure exerted upon foot pedal 9.

As above stated one of the objects of my invention is to provide a system and mechanism for obtaining the braking power through the driving power or momentum of the moving body, and for this purpose I connect between the brake lever system and the pedal, or other manually operated means, a friction device which may be of any desired form, but for the purpose of this specification is illustrated in the drawings in the form of a drum 16 and friction band 18, the drum being mounted upon a shaft 17, which may be a main driving or engine shaft, or a jack-shaft, but in any event a shaft which is actuated through the driving power or the momentum of the vehicle. The friction band 18 is adjustably connected at both ends to rocking levers or cranks 19 and 20, loosely mounted on shaft 21, carried by bearing or support 22, which is illustrated as being part of the same structure in which are formed bearings 23 for the shaft 17. Connected with the cranks 19 and 20 are links 24 and 25, respectively, and these links are connected with cranks 26 and 27, respectively, carried by and fixed on bar 14.

By reference to Figures 3 and 4, it will be observed that the side or arm of crank 20 which is connected to band 18 is slightly longer than the corresponding arm of crank 19, and that the sides which are connected to links 24 and 25, respectively, are of equal length. It will also be observed that the crank 27 on bar 14 is somewhat longer than the crank 26. The purpose of this arrangement is that when the foot pedal 9 is actuated to rock the bar 14, cranks 26 and 27 will, respectively, actuate cranks 19 and 20 through links 24 and 25, imparting on the one hand an upward movement to the band 18, on the right hand side looking at Figure 5, and a downward movement on the left hand side, and through the difference in dimensions as aforesaid, the downward movement of the band will slightly exceed the upward movement, thus slowly bringing the band into frictional engagement with the rotating drum as seen in Figure 6, and producing a pull on band 18 in the direction of the arrow. Through this arrangement, it will be noted, that as the operator continues to move the pedal 9 forward, the movement of the band 18 as just described will be continued and result in a gradually increased frictional engagement between the drum and band, and a gradually increasing pull on link 24. This pull will continue the movement of link 24 started by the pedal movement, Figure 4, but such movement will now be a pull instead of a push, and which in turn will pull the crank 26 and rock the bar 14, and this movement in turn will continue the swing of lever 13 and pull on links 7 and 8 in the direction of the arrows and apply the brakes as above stated, but with power derived from the moving body or vehicle instead of from the foot pedal 9.

It will be evident that the adjustment of links 7 and 8 between lever 13 and rock-shaft 5 and 6, and the adjustment of the connections between band 18 and cranks 19 and 20, may be so arranged that the pedal movement would first cause the brakes to be lightly applied before causing band 18 to come into contact with drum 16, and then the continued movement of the pedal would cause the friction device to act in the manner above described to apply power through the friction device to the brake lever system, and thus supplement the manual power applied to the pedal.

As thus far described, levers 24 and 25 are both indicated as positive link connections between levers 26 and 27 and cranks 19 and 20, but in practice I prefer to connect link 25 with lever 27 through spring tension, and for this purpose I have shown a helical extension spring 25ª hooked to lever 27 and adjustably connected with link 25 by means of a screw-threaded bolt passing through an eye in the hooked end of the link and held by a nut. Thus when link 25 is pulled to the left, Figure 4, through the rocking of bar 14 by the pull on crank 26 by link 24, crank 19, band 18 and drum 16, the spring 25ª will be extended, increasing its tension, but affording a yielding or balanced pull on link 25 and crank 20. This action will prevent the pull on link 25 from resuting in any tendency of the band 18 seizing drum 16 which woud result in a sudden jamming of the brakes. Spring 25ª will, by proper adjustment, maintain a close contact between the drum and band on its side of the system, and continuously serve to take up slack created by the pull of the drum on band 18 so long as the operating pedal is held in a functioning position or its movement in the functioning direction is continued. Thus it will be seen that by reason of the difference in length of the crank arms connected to band 18; the difference in length of the cranks 26 and 27, and the provision of a compensating spring 25ª, a differential lever system is provided between the brake controlling means, the brake operating levers and the friction device. By this arrangement the pull on the brake lever system is automatically adjusted according to the extent of movement of, or the point to which the controlling means or pedal is adjusted and held, and regardless of the amount of pessure applied to such controlling means. In fact the tendency of the differential arrangement is to move the controlling means or pedal forward as the bar 14 is rocked by the pull of link 24 on crank 26 through the pull of band 18 on crank 19; and this action through crank 27 increases the pull on spring 25ª, link 25 and crank 20, taking up slack on band 18, and thereby compensating for the pull of drum 16 on the band and maintaining proper frictional engagement between drum and band. An auxiliary spring 25ᵇ is connected between crank 20 and a bracket 28 to insure the return movement of crank 20 to the normal or non-functioning position of Figure 3 and hold band 18 out of contact with the drum 16 when the braking action is discontinued, and incidentally this spring supplements the pull of spring 25ª on crank 27 to rock bar 14. Thus when the operating means or pedal 9 is released or moved backward, spring 25ª will relax and link 25 will move to the right due to the pull of spring 25ᵇ and cause crank 20 to move band 18 upward and away from the drum, reducing the frictional engagement, and consequently the pull of the drum on the band and crank 19, and permit the entire lever system under the pull of springs 25ª and 25ᵇ to resume the normal or non-functioning position of Figure 3.

What I claim is:

1. In a brake system, the combination with a brake, brake lever and controlling means for manual operation of the brake, of a friction device for applying power to said lever comprising a rotary member and a pulling member adapted to be brought into frictional engagement by the manual operation of said controlling means, and a differential connection between the pulling member and the brake lever, whereby a gradually increasing frictional engagement is obtained at the friction device for gradually increasing the pull on the brake lever to boost the pressure applied by the manual operation.

2. In a brake system, the combination with a brake, brake lever and controlling means for manual operation of the brake, of a friction device for applying power to said lever comprising a rotary member and a pulling member adapted to be brought into frictional engagement by the manual application of the brake, and a differential connection between the pulling member, brake lever and controlling means, whereby a variable frictional engagement at the friction device is obtained to vary the pull on the brake lever.

3. In a brake system, the combination with a brake, brake lever and controlling means, of a friction device for applying power to said lever comprising a rotary member and a pulling member, and a differential lever system connecting the pulling member with the brake lever and controlling means, whereby the degree of movement imparted to the controlling means produces a variable frictional engagement at the friction device to vary the pull on the brake lever.

4. In a brake system, the combination with a brake, brake lever and controlling means, of a friction device for applying power to said lever having one element arranged to be driven through the momentum of a moving body whose motion is to be retarded, a second element connected with the brake lever, and mechanism operated by the controlling means for effecting a differential movement of said second element relative to the driven element to vary the power applied to the brake.

5. In a brake system for vehicles, the combination, with a brake, a rock-shaft having a brake operating lever and manually operated means whereby the rock-shaft is actuated to apply the brake, of a friction device for applying auxiliary power to said shaft, said device comprising a rotary drum actuated through the driving mechanism of the vehicle, a friction band adapted to engage said drum, a positive lever and link connection between one end of said band and the rock-shaft, and a yielding lever and link connection between the other end of said band and the rock-shaft for moving said band into frictional engagement with the drum for applying power to said brake lever.

6. In a brake system for vehicles, the combination with a brake, operating lever and controlling means, of a rotary drum actuated through the driving mechanism of the vehicle, a friction band adapted to engage said drum, crank and link connections between the ends of said band and the brake operating lever, and an operative connection between the controlling means and said cranks and links for moving said band into frictional engagement with the drum for applying power to said brake lever.

7. In a brake system for vehicles, the combination with a brake, operating lever and controlling means, of a rotary drum actuated through the driving mechanism of the vehicle, a friction band adapted to engage said drum, differential crank and link connections between the ends of said band and the brake operating lever, and an operative connection between the controlling means and said cranks and links for imparting a differential movement to said band for effecting a variable frictional engagement with the drum for applying power to said brake lever.

8. In a brake system for vehicles, the combination of a rotary drum actuated through the driving mechanism of the vehicle, a friction band adapted to engage said drum, a pair of crank-levers between which said band is connected, a rock-shaft, a brake operating lever mounted thereon, a pair of cranks on said shaft, links between said crank-levers and cranks, and means for rocking said shaft to actuate said cranks and links to move said band into frictional engagement with the drum, whereby power will be applied through the lever system to the vehicle brake.

9. In a brake system for vehicles, the combination of a rotary drum actuated through the driving mechanism of the vehicle, a friction band adapted to engage said drum, a pair of crank-levers of different leverage between which said band is connected, a rock-shaft, a brake-operating lever mounted thereon, a pair of cranks of different length on said shaft, links between said crank-levers and cranks, and means for rocking said shaft to actuate said cranks and links and thereby imparting a differential movement to said band while moving same into frictional engagement with the drum, whereby power will be gradually applied through the lever system to the vehicle brake.

10. In a brake system as defined in claim 9, a pair of link connections between the crank levers and cranks, comprising a positive link between the shorter pair of cranks, and a yielding link between the longer pair.

11. In a brake system as defined by claim 9, a pair of link connections between the crank-levers and cranks, comprising a positive link between the shorter pair of cranks and a yielding link between the longer pair, and an additional spring connected with the yielding-link crank-lever for restoring the link and lever system to normal non-functioning position.

This specification signed at New York city, in the county and State of New York, this 18th day of May, 1927.

EDWARD SLADE.